US011188596B2

(12) United States Patent
Xue et al.

(10) Patent No.: US 11,188,596 B2
(45) Date of Patent: Nov. 30, 2021

(54) STORAGE OPTIMIZATION FOR PRODUCTS MANUFACTURING

(71) Applicant: International Business Machines Corporation, Armonk, NY (US)

(72) Inventors: Feng Xue, Singapore (SG); Viktor Bruzsa, Vac (HU); Ferenc Simon, Marianosztra (HU); Ferenc Tokodi, Vac (HU); Richard Burton Finch, New Paltz, NY (US); Paul Anthony Zulpa, Woodbury, CT (US); Jeffrey G. Komatsu, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 16/676,496

(22) Filed: Nov. 7, 2019

(65) Prior Publication Data
US 2021/0141832 A1    May 13, 2021

(51) Int. Cl.
*H04W 4/029* (2018.01)
*G06F 16/901* (2019.01)
*G06Q 10/08* (2012.01)
*G06Q 50/28* (2012.01)
*G06F 16/906* (2019.01)
*G07G 1/00* (2006.01)

(52) U.S. Cl.
CPC .......... *G06F 16/906* (2019.01); *G06F 16/901* (2019.01); *G06Q 10/0875* (2013.01); *G06Q 10/08* (2013.01); *G06Q 10/087* (2013.01); *G06Q 10/0833* (2013.01); *G06Q 50/28* (2013.01); *G07G 1/0045* (2013.01)

(58) Field of Classification Search
CPC . G06F 16/901; G06F 16/906; G06Q 10/0875; G06Q 50/28; G06Q 10/0833; G06Q 10/08; G07G 1/0045
USPC ....................................................... 700/214
See application file for complete search history.

(56) References Cited

U.S. PATENT DOCUMENTS

| 4,972,318 | A  | 11/1990 | Brown |
| 5,307,261 | A  | 4/1994  | Maki |
| 5,963,953 | A  | 10/1999 | Cram |
| 6,044,361 | A  | 3/2000  | Kalagnanam |
| 6,338,053 | B2 | 1/2002  | Uehara |
| 6,901,430 | B1 | 5/2005  | Smith |
| 7,344,037 | B1 | 3/2008  | Zakula, Sr. |
| 7,894,933 | B2 | 2/2011  | Mountz |
| 8,010,217 | B2 | 8/2011  | Knipfer |

(Continued)

FOREIGN PATENT DOCUMENTS

| CN | 111932184 A   | * | 11/2020 |
| JP | 2005515947 A  | * | 6/2005  |

*Primary Examiner* — Ly D Pham
(74) *Attorney, Agent, or Firm* — Stephanie L. Carusillo

(57) ABSTRACT

In an approach for storage optimization for products manufacturing, a processor pulls parts data for a set of part numbers. A processor calculates an average shelf time for each part number of the set of part numbers. A processor calculates a priority index for each part number of the set of part numbers based on the average shelf time for each part number of the set of part numbers. A processor determines a category for each part number of the set of part numbers based on the priority index for each part number of the set of part numbers and a quantity of parts cumulative percentage for each part number of the set of part numbers.

20 Claims, 4 Drawing Sheets

(56) References Cited

U.S. PATENT DOCUMENTS

| | | |
|---|---|---|
| 2001/0047293 A1 | 11/2001 | Waller |
| 2004/0236614 A1 | 11/2004 | Keith |
| 2005/0004831 A1 | 1/2005 | Najmi |
| 2007/0299730 A1 | 12/2007 | Erickson |
| 2008/0201001 A1 | 8/2008 | Gerber |
| 2009/0182793 A1* | 7/2009 | Love ...................... G06F 16/20 |
| 2009/0210324 A1 | 8/2009 | Bhogal |
| 2009/0299882 A1 | 12/2009 | Erickson |
| 2011/0246312 A1 | 10/2011 | Meek |
| 2014/0249884 A1 | 9/2014 | Hong |
| 2017/0091690 A1 | 3/2017 | Halasi |
| 2019/0205821 A1* | 7/2019 | Werner .................. G01G 19/42 |
| 2020/0302377 A1* | 9/2020 | Danducci ............. G06Q 10/087 |

* cited by examiner

| PN | $I_p$ | Cumulative % of quantity | Category |
|---|---|---|---|
| C | 10 | 20% | 1 |
| F | 15 | 35% | 1 |
| A | 50 | 45% | 2 |
| D | 60 | 75% | 2 |
| B | 100 | 90% | 3 |
| E | 200 | 100% | 3 |

FIG. 3

STORAGE OPTIMIZATION FOR PRODUCTS MANUFACTURING

BACKGROUND

The present invention relates generally to the field of product manufacturing, and more particularly to storage optimization for products manufacturing.

Products manufacturing is the production of products for use or sale using labor and machines, tools, chemical and biological processing, or formulation, and is the essence of secondary industry. The term is most commonly applied to industrial design, in which raw materials from primary industry are transformed into finished goods on a large scale. Such finished goods may be sold to other manufacturers for the production of other more complex products or distributed via the tertiary industry to end users and consumers.

Modern manufacturing includes all intermediate processes required in the production and integration of a product's components. Mass customization, in manufacturing, is the use of flexible computer-aided manufacturing systems to produce custom output. Mass customization is the method of effectively postponing the task of differentiating a product for a specific customer until the latest possible point in the supply network. Such systems combine the low unit costs of mass production processes with the flexibility of individual customization. Many implementations of mass customization are operational today, such as software-based product configurators that make it possible to add and/or change functionalities of a core product or to build fully custom parts from scratch. Companies that have succeeded with mass-customization business models tend to supply purely electronic products.

SUMMARY

Aspects of an embodiment of the present invention disclose a method, computer program product, and computer system for storage optimization for products manufacturing. A processor pulls parts data for a set of part numbers. A processor calculates an average shelf time for each part number of the set of part numbers. A processor calculates a priority index for each part number of the set of part numbers based on the average shelf time for each part number of the set of part numbers. A processor determines a category for each part number of the set of part numbers based on the priority index for each part number of the set of part numbers and a quantity of parts cumulative percentage for each part number of the set of part numbers.

BRIEF DESCRIPTION OF THE DRAWINGS

FIG. 3 depicts a chart of category assignments for an example embodiment of the present invention.

DETAILED DESCRIPTION

Figure 1:
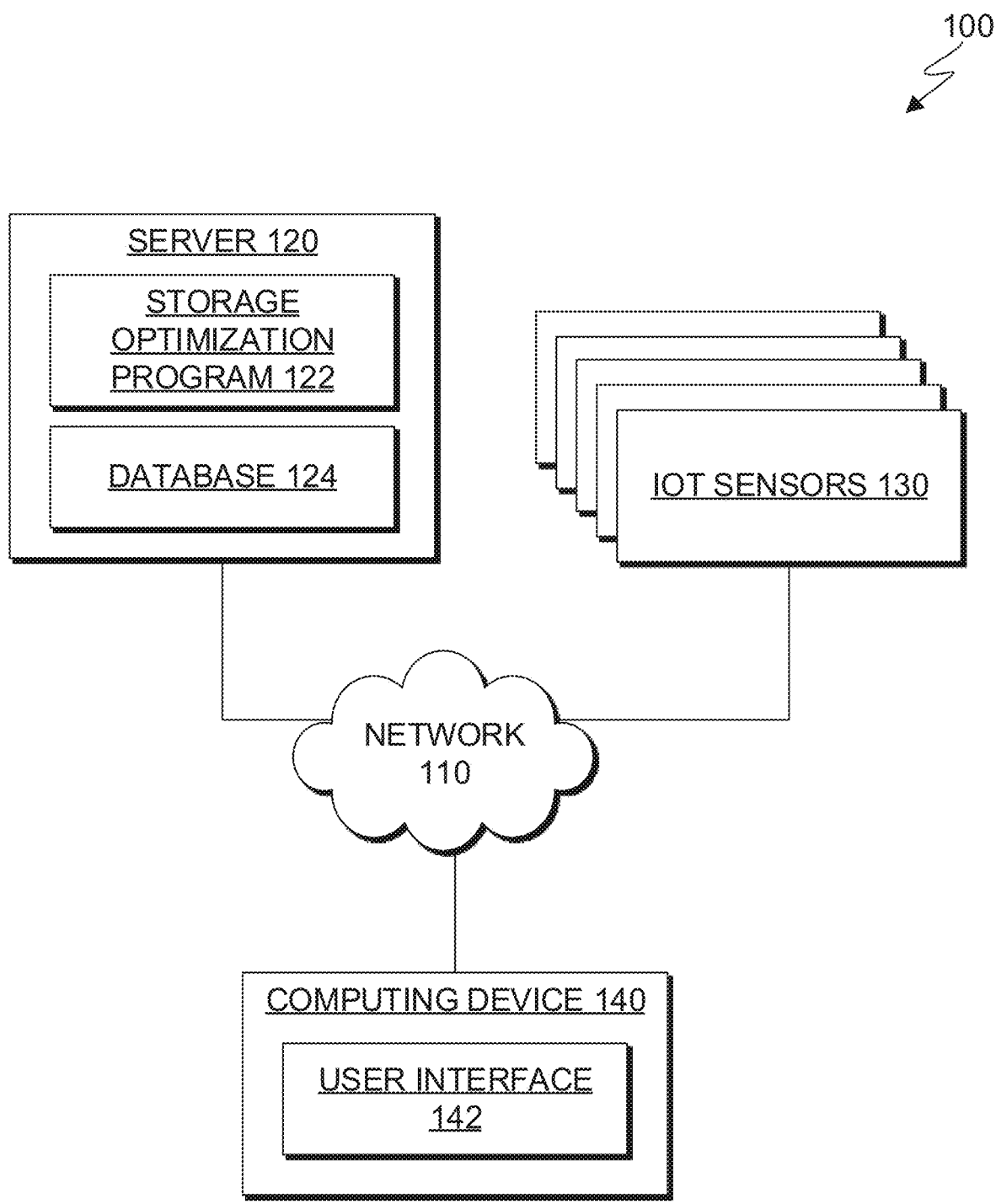
FIG. 1 depicts a block diagram of a products manufacturing environment, in accordance with an embodiment of the present invention.

Embodiments of the present invention recognize that customer-configurable products manufacturing involves re-configuration of components (i.e., parts) or modules that are removed from and/or added into a standard product configuration at a product build station. Embodiments of the present invention further recognize that the efficiency and accuracy of the re-configuration process is heavily dependent on sub-processes, i.e., order management, component/module availability, physical management of component/module (e.g., storage, retrieval, etc.). Traditionally, the re-configuration process is managed manually or in a "disconnected" digital way. The manual process is not only inefficient, but prone to errors. The "disconnected" digital process is often more accurate, but the efficiency is not optimized because each individual sub-process is not linked, which undermines the data sharing between each sub-process causing inefficiencies. Thus, there is a need for a re-configuration process that is more connected improving efficiency and accuracy. Embodiments of the present invention propose a system and method for a connected re-configuration process where data across each individual sub-process is available in a common platform and is used by an optimization program to significantly improve efficiency of the re-configuration process.

In the re-configuration process, several challenges exist due to competing factors including order loading, inventor cost, and shipment schedule. For highly customer-configurable products, if the lead time of order loading is short, manufacturing has very poor visibility on the components/modules and their quantity that are required to be added into the product during re-configuration. The availability of components/modules that are required to be added, referred to as "parts to be added", can not always be assured when the order arrives in re-configuration, which may cause delays in shipment schedule. The re-configuration process usually has a storage area attached. The storage area holds parts to be added, either directly shipped from part manufacturers or pre-built in the factory, ready to be used in re-configuration. As the re-configuration process also removes components/modules from the standard configuration, referred to as "parts to be removed", parts to be removed are also stored in the storage area for future use/disposition. Lack of visibility of the real-time storage status of the storage area often undermines the efficiency of checking parts availability and the physical storing and retrieval of the parts. Embodiments of the present invention do not attempt to solve the challenges of these competing factors, but instead propose a system and method to optimize the efficiency of the re-configuration process at any given order loading and parts availability by leveraging real-time storage information. Embodiments of the present invention implement real-time storage monitoring via an IoT sensor network to monitor and record timestamps of transactions and part information. Embodiments of the present invention map the entire storage area to its digital twin based on its hierarchical physical set up.

Embodiments of the present invention address the following major problem areas in the re-configuration process: (1) lack of visibility of the availability of materials and parts in storage for upcoming product orders; (2) time-consuming manual search and retrieval of materials and parts; and (3) disorder when storing parts. Embodiments of the present invention improve the efficiency of the re-configuration process in the following areas: (1) an optimization program picks a product order with sufficient material in the storage area for build, minimizing the waiting-for-material idle time in build stations; (2) the operator knows the exact storage location to retrieve the parts, eliminating time-consuming part searching; and (3) "hot" parts are stored closer to the build station, reducing part transportation time, especially in high volume production environments.

Embodiments of the present invention ensure that parts having a short shelf life, i.e., used more frequently, are stored in closer proximity to a build station. When two different parts have a similar shelf life, the part having a higher quantity in storage is given a higher priority, and therefore, a closer proximity to a build station. For example, when there are three categories, category 1 is the closest to a build station and can be designated as "hot", category 2 is a medium distance from a build station and can be designated as "normal", and category 3 is far from a build station and can be designated as "cold". A unique identification (ID) or proximity ID can be assigned to a lowest hierarchy storage unit to further refine the proximity resolution within a same category or within a storage hierarchy. In an example of a computer server blade storage with two hierarchies, racks and slots with each rack having N slots, a proximity ID can be set up for each slot as Hot-1-1, Hot-1-2, . . . Hot-1-N, Hot 2-1, Hot-2-2, . . . Hot-2-N, Normal-1-1, Normal-1-2, . . . Normal-1-N, Normal-2-1, . . . Normal-2-N, Cold-1-1, . . . Cold-1-N, Cold-2-1, . . . Cold-2-N.

Embodiments of the present invention utilize a process when storing a part into the storage area. Embodiments of the present invention check whether the part is required for the next build against the "parts to be added" for the current order or transaction. If the part is required, embodiments of the present invention assign the category of highest priority to this part and give the instruction to store the part to the "next available unit" in the highest priority storage category. "Next available unit" refers to the empty storage unit of lowest hierarchy in a given category that has the smallest proximity ID. In the event that the corresponding category is full, the next available unit will be the next category with less priority. For example, if "hot" storage is full, the next available unit is the empty storage unit of lowest hierarchy in "normal" storage that has the smallest proximity ID. If the part is not required, embodiments of the present invention assign a category based on the part's usage prediction and give the instruction to store the part in the next available slot in the corresponding storage category. When a part is stored in the storage area, embodiments of the present invention tag the part and its proximity ID with the default "available" status.

Embodiments of the present invention act as the back-end platform for the physical retrieval and storing of parts by an automated guided vehicle (AGV), e.g., robotics.

Embodiments of the present invention utilize upcoming order data that enables real-time data sharing of an order number, a serial number of a final assembly to be re-configured, a part number and quantity of parts to be added, a part number and quantity of parts to be removed, and an order priority. For each data transaction, new order data is added to an order data database with the time stamp of the transaction.

The present invention will now be described in detail with reference to the Figures.

FIG. 1 depicts a functional block diagram illustrating products manufacturing environment 100, in accordance with an embodiment of the present invention. FIG. 1 provides only an illustration of one embodiment of the present invention and does not imply any limitations with regard to the environments in which different embodiments may be implemented. In the depicted embodiment, products manufacturing environment 100 includes server 120, IoT sensors 130, and computing device 140 interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 120, IoT sensors 130, and computing device 140. Products manufacturing environment 100 may include additional servers, computers, or other devices not shown.

Server 120 operates to run storage optimization program 122 and store and/or send data using database 124. In the depicted embodiment, server 120 houses storage optimization program 122 and database 124. In other embodiments (not shown), storage optimization program 122 and database 124 may be housed on separate computing devices. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of communicating with IoT sensors 130 and computing device 140 via network 110. In other embodiments, server 120 represents a server computing system utilizing multiple computers as a server system, such as in a cloud computing environment. Server 120 may include components as described in further detail in FIG. 4.

Storage optimization program 122 operates as a program for optimizing storage of parts to improve the efficiency of the re-configuration process for products manufacturing by leveraging real-time storage information. In an embodiment, storage optimization program 122 pulls real-time parts data for a set of part numbers, calculates an average shelf time for each part number of the set of part numbers, calculates a priority index for each part number of the set of part numbers, determines a category for each part number of the set of part numbers, and outputs the category for each part number of the set of part numbers. In the depicted embodiment, storage optimization program 122 resides on server 120. In other embodiments, storage optimization program 122 may reside on another computing device (not shown), provided that storage optimization program 122 has access to network 110.

Database 124 operates as a repository for data received, used, and/or output by storage optimization program 122. Database 124 can be implemented with any type of storage device capable of storing data and configuration files that can be accessed and utilized by server 120, such as a database server, a hard disk drive, or a flash memory. In an embodiment, database 124 is accessed by storage optimization program 122, server 120, and/or computing device 140 to store and/or to access the data. In the depicted embodiment, database 124 resides on server 120. In another embodiment, database 124 may reside elsewhere within products manufacturing environment 100, provided that database 124 has access to network 110.

Data received, used, and/or generated by storage optimization program 122 may include, but is not limited to, real-time parts data, category assignments for a set of part numbers, and the storage area's digital twin. Parts data includes, but is not limited to, whether a lowest-hierarchy storage unit is occupied or empty; if the unit is occupied, part numbers of the parts stored in the unit; a quantity of each part number stored in the unit; and a shelf time of each part. IoT sensors 130 send parts data in real-time for every storage transaction, i.e., whenever a part is stored or retrieved from the storage area. The storage area's digital twin includes a map of the storage area and hierarchal breakdown of the storage units within the storage area. For example, with a computer server blade storage area, the highest hierarchy is a rack and each rack has slots, therefore, the slot is the lowest-hierarchy storage unit. In another example, for a mechanical parts storage area, the highest hierarchy is a rack, each rack has rows, and each row has pigeon holes, therefore, the pigeon hole is the lowest-hierarchy storage unit. The digital twin is updated as real-time parts data is received from IoT sensors 130.

IoT sensors 130 operate to collect and send parts data. In an embodiment, IoT sensors 130 operates to collect real-time parts data from a storage area. In general, IoT sensors can be embedded in or associated with physical assets or devices, i.e., industrial equipment, commercial buildings, industrial facilities, smart locks, garage doors, refrigerators, A/C units, washer/dryer units, mobile devices, smart watches, smart TVs, virtual assistance devices, surveillance cameras, and any other assets or devices. In general, IoT sensors 130 can collect data from the physical asset including, but not limited to, parts data. In an embodiment, IoT sensors 130 send the parts data collected to database 124 and/or storage optimization program 122, which determines a category for a given part based, at least in part, on the parts data collected. In an embodiment, products manufacturing environment 100 contains IoT sensors 130.

Computing device 140 operates to run user interface 142. In some embodiments, computing device 140 may be, but is not limited to, an electronic device, such as a laptop computer, a tablet computer, a netbook computer, a personal computer (PC), a desktop computer, a smart phone, or any programmable electronic device capable of running user interface 142 and communicating (i.e., sending and receiving data) with server 120 and storage optimization program 122 via network 110. In some embodiments, computing device 140 represents one or more programmable electronic devices or combination of programmable electronic devices capable of executing machine readable program instructions and communicating with server 120 and/or other computing devices (not shown) within distributed data processing environment 100 via a network, such as network 110. In an embodiment, computing device 140 represents one or more devices associated with a user. In the depicted embodiment, computing device 140 includes an instance of user interface 142. Computing device 140 may include components as described in further detail in FIG. 4.

In some embodiments, computing device 140 operates as a system that manages the actual storage and location of parts. In an embodiment, computing device 140 manages the actual storage and location of incoming new parts and/or currently stored parts based on category assignments for a set of part numbers determined by storage optimization program 122. In an embodiment, computing device 140 operates an autonomous robotic system that moves and/or stores parts based on the category assignments.

User interface 142 operates as a local user interface on computing device 140 through which a user can pre-set settings for a storage area, i.e., a number of categories and/or a time interval for pulling parts data, that is stored in the storage area's digital twin. In some embodiments, user interface 142 is a graphical user interface (GUI), a web user interface (WUI), and/or a voice user interface (VUI) that can display (i.e., visually) or present (i.e., audibly) information (such as graphics, text, and/or sound) sent from storage optimization program 122 to a user via network 110. In an embodiment, user interface 142 enables a user to pre-set settings, i.e., a number of categories and/or a time interval for pulling parts data. In an embodiment, user interface 142 enables a user to receive and view the category assigned to each part number of a set of part numbers. In an embodiment, user interface 142 is capable of sending and receiving data (i.e., to and from storage optimization program 122 via network 110, respectively).

In an embodiment, user interface 142 enables a user to pre-set a number of categories (e.g., storage unit categories) based on a proximity of a storage unit to a build station. In an embodiment, user interface 142 enables a user to pre-set the number of categories in the storage area's digital twin. In an embodiment, user interface 142 enables a user to define a category for each highest hierarchy storage unit in the storage area with the physically closest storage units to a build station being assigned the highest priority category. For example, in an embodiment in which a user has pre-set the number of categories to three, category 1 is the closest to a build station and can be designated as "hot", category 2 is a medium distance from a build station and can be designated as "normal", and category 3 is far from a build station and can be designated as "cold". In some embodiments, user interface 142 enables a user to assign a unique identification (ID) or proximity ID to a lowest hierarchy storage unit to further refine the proximity resolution within a same category or within a storage hierarchy. In an example of a computer server blade storage with two hierarchies, racks and slots with each rack having N slots, a user, who has pre-set three categories, can set up a proximity ID for each slot as Hot-1-1, Hot-1-2, . . . Hot-1-N, Hot 2-1, Hot-2-2, . . . Hot-2-N, Normal-1-1, Normal-1-2, . . . Normal-1-N, Normal-2-1, . . . Normal-2-N, Cold-1-1, . . . Cold-1-N, Cold-2-1, . . . Cold-2-N.

Figure 2:
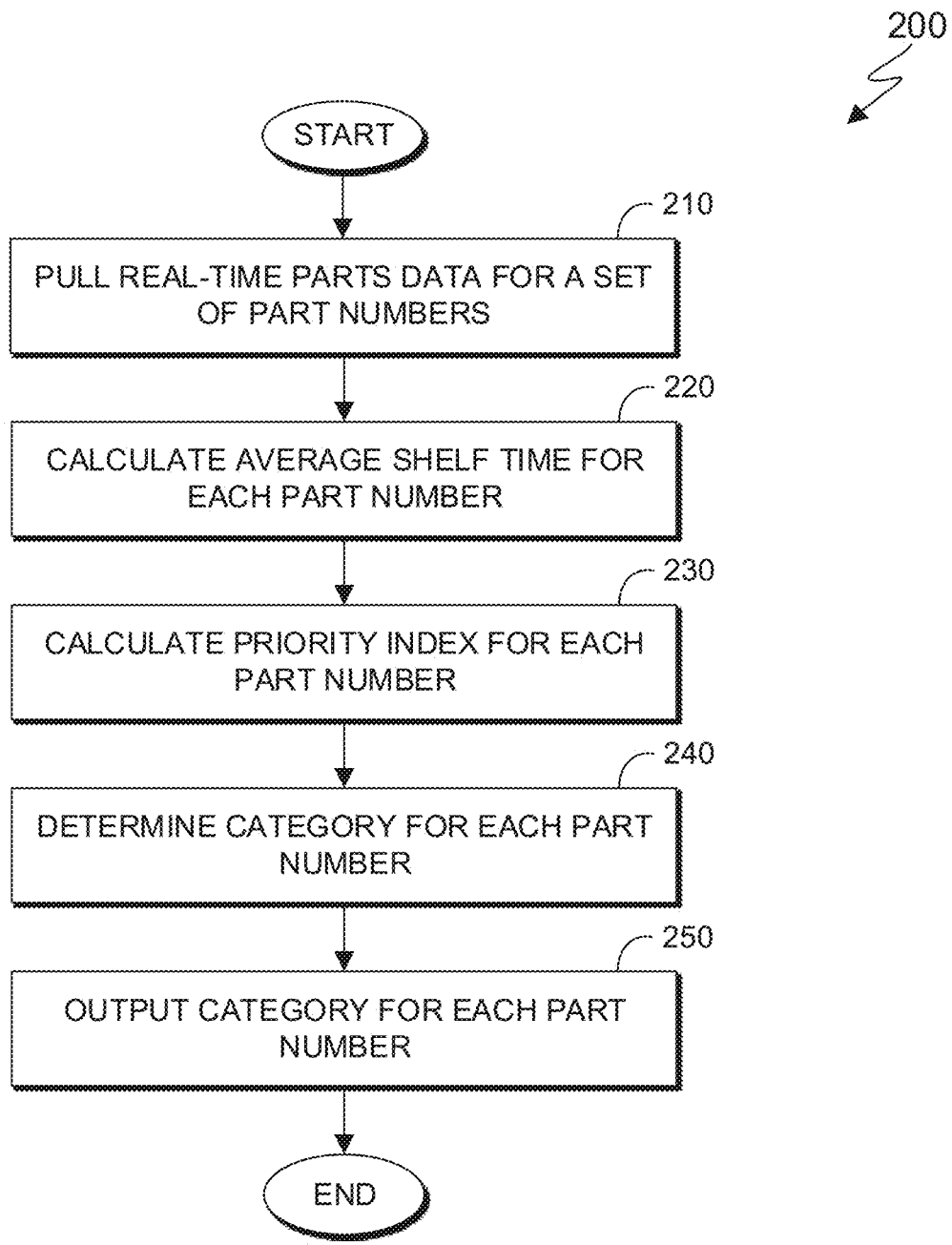
FIG. 2 depicts a flow chart of the steps of a storage optimization program, in accordance with an embodiment of the present invention.

FIG. 2 depicts a flowchart 200 of the steps of storage optimization program 122, in accordance with an embodiment of the present invention. In the depicted embodiment, storage optimization program 122 pulls real-time parts data for a set of parts numbers, calculates an average shelf time for each part number of the set of part numbers, calculates a priority index for each part number of the set of part numbers, determines a category for each part number of the set of part numbers, and outputs the category for each part number of the set of part numbers. It should be appreciated that the process depicted in FIG. 2 illustrates one possible iteration of the process flow, which repeats each pre-set time interval, e.g., one hour, one day, one week, etc. The pre-set time interval may be based on production volume and/or may be set by a user through user interface 142.

In step 210, storage optimization program 122 pulls real-time parts data for a set of part numbers. In an embodiment, storage optimization program 122 can pull real-time parts data for a set of part numbers (PNs) involved in a storage transaction. In an embodiment, storage optimization program 122 pulls the parts data from the storage area's digital twin stored in a database, e.g., database 124. The real-time parts data for a given PN includes, but is not limited to, a quantity of parts N stored in a storage area for a given period of time and a shelf time of each individual part $\Delta_{tn}$ (n=1, 2, . . . N) (i.e., a difference between timestamp of storing and timestamp of retrieving or timestamp of calculation if the part is still in storage) under the given PN.

In step 220, storage optimization program 122 calculates an average shelf time for each PN of the set of PNs. In an embodiment, storage optimization program 122 calculates an average shelf time $\overline{\Delta}_{tn}$ of a given PN using equation (1).

$$\overline{\Delta}_{tn} = \frac{\sum_{n=1}^{N} \Delta_{tn}}{N} \tag{1}$$

In step 230, storage optimization program 122 calculates a priority index for each PN of the set of PNs. In an embodiment, storage optimization program 122 calculates a priority index $I_P$ for a given PN using equation (2). The priority index is proportional to the average shelf time and reverse-proportional to the quantity of parts, therefore, a PN that sits for less time in the storage area has a smaller priority index and a PN that has a larger quantity (transaction quantity) of parts has an even smaller priority index. A small priority index generally indicates a high priority category for the PN and a large priority index generally indicates a low priority category for the PN.

$$I_P = \frac{\bar{\Delta}_{tn}}{N} = \frac{\sum_{n=1}^{N} \Delta_{tn}}{N^2} \qquad (2)$$

Therefore, if there are m PNs involved in a storage transaction in a given period of time, storage optimization program 122 establishes $I_{P1}, I_{P2}, \ldots I_{Pm}$ for $PN_1, PN_2, \ldots PN_m$. Equation (2) for priority index assumes all PNs have similar physical attributes (e.g., lengths and widths) and similar risk (e.g., value, moisture sensitivity) associated with storage. In an embodiment when PNs involved have different physical attributes or risk associated with storage, storage optimization program 122 uses a tuning factor TF (or a plurality of tuning factors) to take the physical attributes and risk into consideration as shown in equation (3).

$$I_P = \frac{\sum_{n=1}^{N} \Delta_{tn}}{N^2} * TF \qquad (3)$$

In step 240, storage optimization program 122 determines a category for each PN of the set of PNs. In an embodiment, storage optimization program 122 sorts the PNs based on their $I_P$ in ascending order and puts the quantity of parts cumulative percentage against each PN. FIG. 3 depicts a chart for an example embodiment of the present invention in which there are six PNs. FIG. 3 shows the priority indexes for the six PNs have been sorted in ascending order from PN C with an $I_P$ of 10 to PN E with an $I_P$ of 200. In an embodiment, storage optimization program 122 determines quantity of parts cumulative percentage for a given PN based on the ordering of the priority indexes. The quantity of parts cumulative percentage for a given PN equals the percentage of the quantity of the given PN in storage in relation to the quantity of total parts in storage plus the cumulative percentage of the previous PN. In an embodiment, storage optimization program 122 calculates the percentage of the quantity of the given PN based on the known value N for each part. In an example embodiment with three parts, PN-1 has an N value of 150, PN-2 has an N value of 250, and PN-3 has an N value of 500, therefore, storage optimization program 122 calculates a total quantity of parts to be 900 and the percentage of the quantity of PN-1 to be 150/900 or 16.7%, the percentage of the quantity of PN-2 to be 250/900 or 27.8%, and the percentage of the quantity of PN-3 to be 500/900 or 55.6%.

In the example embodiment as shown in FIG. 3, PN C takes up 20% of the total volume of parts in storage, and since PN C is listed first, storage optimization program 122 determines the quantity of parts cumulative percentage for PN C to be 20%. PN F takes up 15% of the total volume of parts in storage, so storage optimization program 122 determines the quantity of parts cumulative percentage for PN C to be 20%+15%=35%. PN A takes up 10% of the total volume of parts in storage, so storage optimization program 122 determines the quantity of parts cumulative percentage for PN A to be 35%+10%=45%. PN D takes up 30% of the total volume of parts in storage, so storage optimization program 122 determines the quantity of parts cumulative percentage for PN D to be 45%+30%=75%. PN B takes up 15% of the total volume of parts in storage, so storage optimization program 122 determines the quantity of parts cumulative percentage for PN B to be 75%+15%=90%. PN E takes up 10% of the total volume of parts in storage, so storage optimization program 122 determines the quantity of parts cumulative percentage for PN E to be 90%+10%=100%.

In an embodiment, storage optimization program 122 assigns each PN to a category based on the quantity of parts cumulative percentage for the given PN. In some embodiments, storage optimization program 122 assigns each PN to a category based on the quantity of parts cumulative percentage for the given PN and the percentage of storage space allotted to each category. If there is no designated percentage of storage space allotted for each category, storage optimization program 122 assumes each category is allotted and equal amount of storage space. In an embodiment, the number of categories has been pre-set by a user through user interface 142. In another embodiment, the number of categories is based on the amount of storage space available.

For example, as shown in FIG. 3, storage optimization program 122 has three categories to assign the six PNs to and there is no designated percentage of storage space allotted for each category, therefore, storage optimization program 122 assumes each category gets 33.3% of the storage space. Category 1 is the "hot" storage location, Category 2" is the "medium" storage location, and Category 3 is the "cold" storage location. As shown in FIG. 3, trying to have as close to 33.3% of parts in each category, storage optimization program 122 assigns PNs C and F with a quantity of parts percentage of 35% to category one, PNs A and D with a quantity of parts percentage of 45% to category two, and PNs B and E with a quantity of parts percentage of 25% to category 3.

In an embodiment in which there are designated percentages of storage space allotted for each category, storage optimization program 122 follows the actual percentage of storage space allotted to each category. For example, if 10% of the storage space is allotted for category 1, 60% for category 2, and 30% for category 3, storage optimization program 122 would assign the PNs with the lowest index and that made up 10% of the total quantity of parts to category 1, the PNs with medium priority indexes and that made up the next 60% of the total quantity of parts to category 2, and the PNs with high priority indexes and that made up the next 30% of the total quantity of parts to category 3.

In step 250, storage optimization program 122 outputs the category for each part number of the set of part numbers. In an embodiment, storage optimization program 122 outputs the category assignments for the set of part numbers to a computing device, i.e., computing device 140, for a user to view the category assignments for the set of part numbers through a user interface, i.e., user interface 142. In an embodiment, storage optimization program 122 outputs the category assignments for the set of part numbers to a computing system (not shown) that manages the actual storage and location of parts in the storage area. In an embodiment, storage optimization program 122 issues a storing instruction for a set of part numbers based on the category assignments determined to a computing system (not shown) that manages the actual storage and location of parts in the storage area, e.g., an autonomous robotic system. In an embodiment, storage optimization program 122 stores the category assignments of the set of part numbers in database 124.

Figure 4:
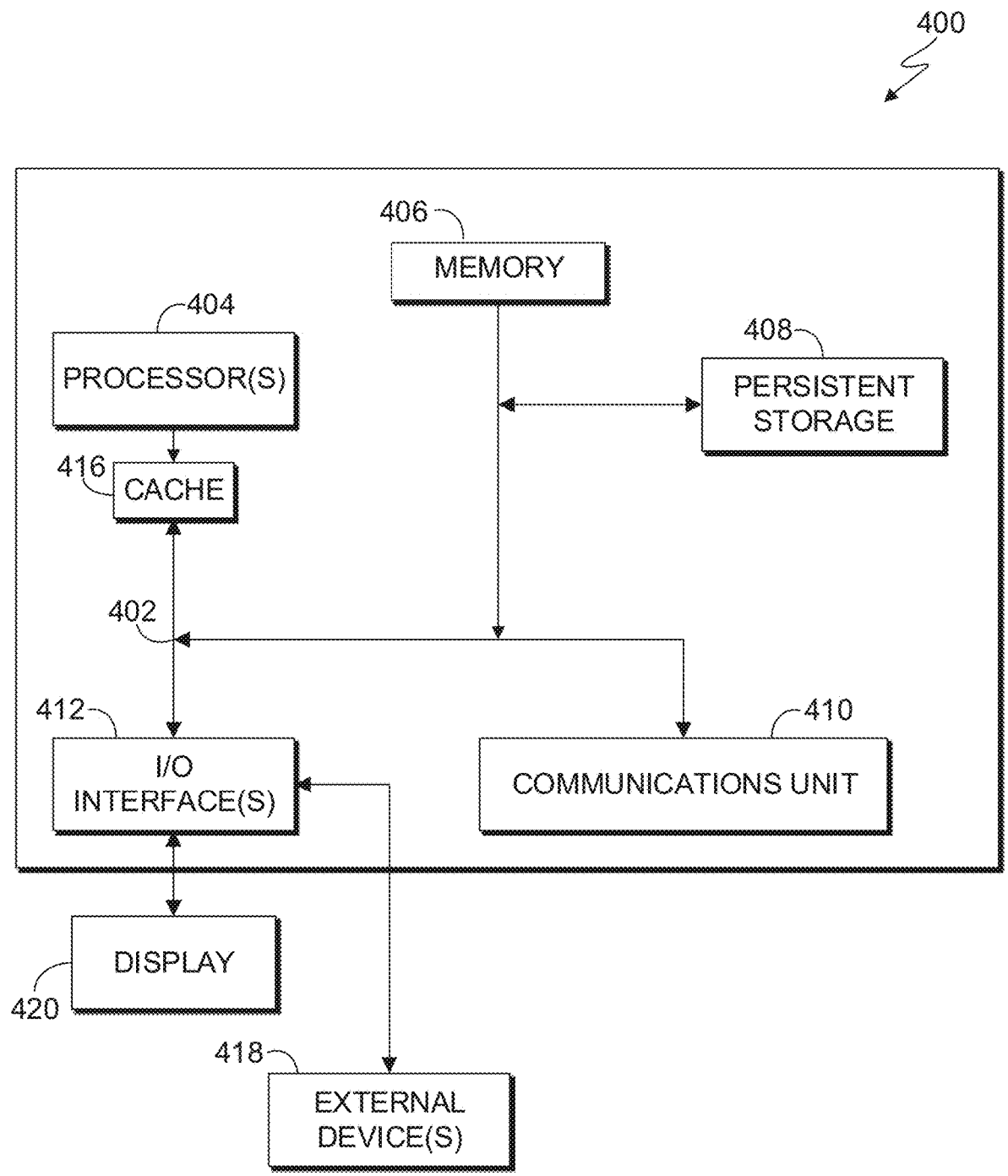
FIG. 4 depicts a block diagram of a computing device of products manufacturing environment, in accordance with an embodiment of the present invention.

FIG. 4 depicts a block diagram of computer 400 suitable for server 120 and computing device 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Storage optimization program 122 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as storage optimization program 122, may be downloaded to persistent storage 408 through communications unit 410.

I/O interface(s) 412 allows for input and output of data with other devices that may be connected to computing device 140 and server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for storage optimization for products manufacturing, the computer-implemented method comprising:
    pulling, by one or more processors, parts data for a set of part numbers;
    calculating, by one or more processors, an average shelf time for each part number of the set of part numbers;
    calculating, by one or more processors, a priority index for each part number of the set of part numbers based on the average shelf time for each part number of the set of part numbers; and
    determining, by one or more processors, a category for each part number of the set of part numbers based on the priority index for each part number of the set of part numbers and a part number quantity percentage for each part number of the set of part numbers.

2. The computer-implemented method of claim 1, wherein the parts data for each part number of the set of part numbers includes a quantity of a respective part number stored in a storage area and a shelf time of each individual part of the respective part number.

3. The computer-implemented method of claim 1, wherein the average shelf time for a respective part number is based on a shelf time of each individual part of the respective part number and a quantity of the respective part number stored in a storage area.

4. The computer-implemented method of claim 1, wherein the priority index is proportional to the average shelf time for a respective part number and reverse-proportional to a quantity of the respective part number stored in a storage area.

5. The computer-implemented method of claim 1,
    sorting, by one or more processors, the set of part numbers based on the priority index for each part number in ascending order to create an ordered set of part numbers.

6. The computer-implemented method of claim 1, further comprising:
    calculating, by one or more processors, a part number quantity percentage based on a quantity of parts of a given part number and a total quantity of parts of each part number of the set of parts.

7. The computer-implemented method of claim 1, wherein the category is one of a pre-set number of categories that is pre-set by a user through a user interface of a computing device.

8. A computer program product for storage optimization for products manufacturing, the computer program product comprising:
   one or more computer readable storage media and program instructions stored on the one or more computer readable storage media, the program instructions comprising:
   program instructions to pull parts data for a set of part numbers;
   program instructions to calculate an average shelf time for each part number of the set of part numbers;
   program instructions to calculate a priority index for each part number of the set of part numbers based on the average shelf time for each part number of the set of part numbers; and
   program instructions to determine a category for each part number of the set of part numbers based on the priority index for each part number of the set of part numbers and a quantity of parts cumulative percentage for each part number of the set of part numbers.

9. The computer program product of claim 8, wherein the parts data for each part number of the set of part numbers includes a quantity of a respective part number stored in a storage area and a shelf time of each individual part of the respective part number.

10. The computer program product of claim 8, wherein the average shelf time for a respective part number is based on a shelf time of each individual part of the respective part number and a quantity of the respective part number stored in a storage area.

11. The computer program product of claim 8, wherein the priority index is proportional to the average shelf time for a respective part number and reverse-proportional to a quantity of the respective part number stored in a storage area.

12. The computer program product of claim 8, further comprising:
   program instructions to sort the set of part numbers based on the priority index for each part number in ascending order.

13. The computer program product of claim 12, further comprising:
   program instructions to calculate a part number quantity percentage based on a quantity of parts of a given part number and a total quantity of parts of each part number of the set of parts.

14. The computer program product of claim 12, wherein the category is one of a pre-set number of categories that is pre-set by a user through a user interface of a computing device.

15. A computer system for storage optimization for products manufacturing, the computer system comprising:
   one or more computer processors;
   one or more computer readable storage media;
   program instructions stored on the computer readable storage media for execution by at least one of the one or more processors, the program instructions comprising:
   program instructions to pull parts data for a set of part numbers;
   program instructions to calculate an average shelf time for each part number of the set of part numbers;
   program instructions to calculate a priority index for each part number of the set of part numbers based on the average shelf time for each part number of the set of part numbers; and
   program instructions to determine a category for each part number of the set of part numbers based on the priority index for each part number of the set of part numbers and a quantity of parts cumulative percentage for each part number of the set of part numbers.

16. The computer system of claim 15, wherein the parts data for each part number of the set of part numbers includes a quantity of a respective part number stored in a storage area and a shelf time of each individual part of the respective part number.

17. The computer system of claim 15, wherein the average shelf time for a respective part number is based on a shelf time of each individual part of the respective part number and a quantity of the respective part number stored in a storage area.

18. The computer system of claim 15, wherein the priority index is proportional to the average shelf time for a respective part number and reverse-proportional to a quantity of the respective part number stored in a storage area.

19. The computer system of claim 15, further comprising:
   program instructions to sort the set of part numbers based on the priority index for each part number in ascending order.

20. The computer system of claim 19, further comprising:
   program instructions to calculate a part number quantity percentage based on a quantity of parts of a given part number and a total quantity of parts of each part number of the set of parts.

\* \* \* \* \*